United States Patent
Yu et al.

(10) Patent No.: US 8,912,896 B1
(45) Date of Patent: Dec. 16, 2014

(54) TPMS SETTING TOOL

(71) Applicant: Cub Elecparts Inc., Changhua (TW)

(72) Inventors: San-Chuan Yu, Changhua County (TW); Yuan-Tung Hung, Changhua County (TW); Tsan-Nung Wang, Changhua County (TW); Chi-Hung Chen, Changhua County (TW); Chao-Ching Hu, Tainan (TW)

(73) Assignee: Cub Elecparts Inc., Fuxing Township, Changhua County (TW)

( * ) Notice: Subject to any disclaimer, the term of this patent is extended or adjusted under 35 U.S.C. 154(b) by 0 days.

(21) Appl. No.: 13/913,230

(22) Filed: Jun. 7, 2013

(51) Int. Cl.
B60C 23/00 (2006.01)
B60C 23/02 (2006.01)
B60C 23/04 (2006.01)

(52) U.S. Cl.
CPC ................................ B60C 23/0433 (2013.01)
USPC ...... 340/447; 340/442; 340/445; 340/426.33; 73/146.2; 73/146.8; 73/146.4

(58) Field of Classification Search
USPC .................... 340/447, 442–446, 448, 426.33; 702/50, 36, 1; 73/146, 146.2–146.5, 73/146.8
See application file for complete search history.

(56) References Cited

U.S. PATENT DOCUMENTS

| | | | |
|---|---|---|---|
| 7,589,619 B2 * | 9/2009 | DeKeuster et al. | 340/442 |
| 8,670,898 B2 * | 3/2014 | Li | 701/36 |
| 8,680,980 B2 * | 3/2014 | Yu et al. | 340/442 |
| 2002/0084896 A1 * | 7/2002 | Dixit et al. | 340/447 |
| 2003/0145650 A1 * | 8/2003 | Juzswik et al. | 73/146 |
| 2008/0164846 A1 * | 7/2008 | DeKeuster et al. | 320/115 |
| 2008/0164988 A1 * | 7/2008 | DeKeuster et al. | 340/442 |
| 2009/0184814 A1 * | 7/2009 | Lee et al. | 340/447 |
| 2012/0218096 A1 * | 8/2012 | Yu et al. | 340/447 |
| 2013/0106596 A1 * | 5/2013 | Mouchet | 340/445 |
| 2013/0145834 A1 * | 6/2013 | Mouchet | 73/146.4 |
| 2013/0204548 A1 * | 8/2013 | Yu et al. | 702/50 |

\* cited by examiner

*Primary Examiner* — Hoi Lau
(74) *Attorney, Agent, or Firm* — Muncy, Geissler, Olds & Lowe, P.C.

(57) ABSTRACT

A TPMS setting tool includes a housing carrying a display unit and an input device on the outside and a circuit board and a power supply device on the inside, the power supply device and the circuit board being electrically coupled together to provide the TPMS setting tool with the necessary working power supply. The housing has a receptacle provided at one side thereof and a connection port with multiple pins mounted inside the receptacle for the connection of a TPMS, enabling the desired communication protocol and ID code to be written into the inserted TPMS.

3 Claims, 3 Drawing Sheets

TPMS SETTING TOOL

BACKGROUND OF THE INVENTION

1. Field of the Invention

The present invention relates to tire pressure monitoring technology and more particularly, to a TPMS (tire pressure monitoring system) setting tool.

2. Description of the Related Art

Wireless communication technology is commonly used in commercial TPMSs (Tire Pressure Monitoring System) for system checking or protocol/identification programming. This programming operation can be done in two methods.

The first method is to pre-store different communication protocols in the memory of the TPMS, and then to send a command wirelessly through a setting tool to select one communication protocol for execution. This method has drawbacks: The limited memory space of the TPMS does not allow storage of a large amount of communication protocols, therefore the storage amount is limited and it is not allowed for expansion. Further, during the wireless operation, it cannot immediately judge whether or not the configuration of the TPMS corresponds to the set configuration. After programmed, it cannot make sure that the TPMS has been activated or not. Further, this wireless transmission method can cause all TPMSs within the wireless signal range to receive the transmitted signal and to have their system configuration be altered or erroneously set.

The second method is to pre-store a BIOS (Basic Input/Output System), and then to write the desired communication protocol into the TPMS by means of a setting tool in a wireless manner. This method has drawbacks below: Because it adopts wireless connection, the programming procedure must be rigorously examined, slowing down the speed of the whole operation. More particularly, it cannot immediately determine whether or not the configuration of the TPMS corresponds to the set configuration during the wireless operation, or make sure that the TPMS has been activated immediately after programming. Further, due to wireless transmission, surrounding TPMSs within the wireless signal range can receive the signal, causing the settings of surrounding TPMSs to be altered or erroneously set. Therefore, improvement in this regard is required.

SUMMARY OF THE INVENTION

The present invention has been accomplished under the circumstances in view. It is the main object of the present invention to provide a TPMS (tire pressure monitoring system), which significantly shortens the operating time in setting a tire pressure monitoring system.

It is another object of the present invention to provide a TPMS (tire pressure monitoring system) setting tool, which prevents the settings of surrounding TPMSs to be altered or erroneously set.

It is still another object of the present invention to provide a TPMS (tire pressure monitoring system) setting tool, which allows immediate reading of the ID code been written into a TPMS, making sure that the programming is successful.

To achieve these and other objects of the present invention, a TPMS setting tool of the present invention comprises a housing having mounted thereon a display unit and an input device and mounted therein a circuit board and a power supply device. The power supply device is electrically coupled to the circuit board for providing the TPMS setting tool with the necessary working power supply. The circuit board comprises a MCU (micro control unit) electrically coupled with the display unit and the input device, a memory unit electrically connected to the MCU and adapted for storing communication protocols, a low-frequency communication unit electrically connected to the MCU, a radio-frequency communication unit electrically connected to the MCU, a clock system electrically connected to the MCU, and a connection port electrically connected to the MCU, said connection port comprising a plurality of pins. Further, the connection port comprises a plurality of pins.

Other advantages and features of the present invention will be fully understood by reference to the following specification in conjunction with the accompanying drawings, in which like reference signs denote like components of structure.

DETAILED DESCRIPTION OF THE INVENTION

Figure 1:
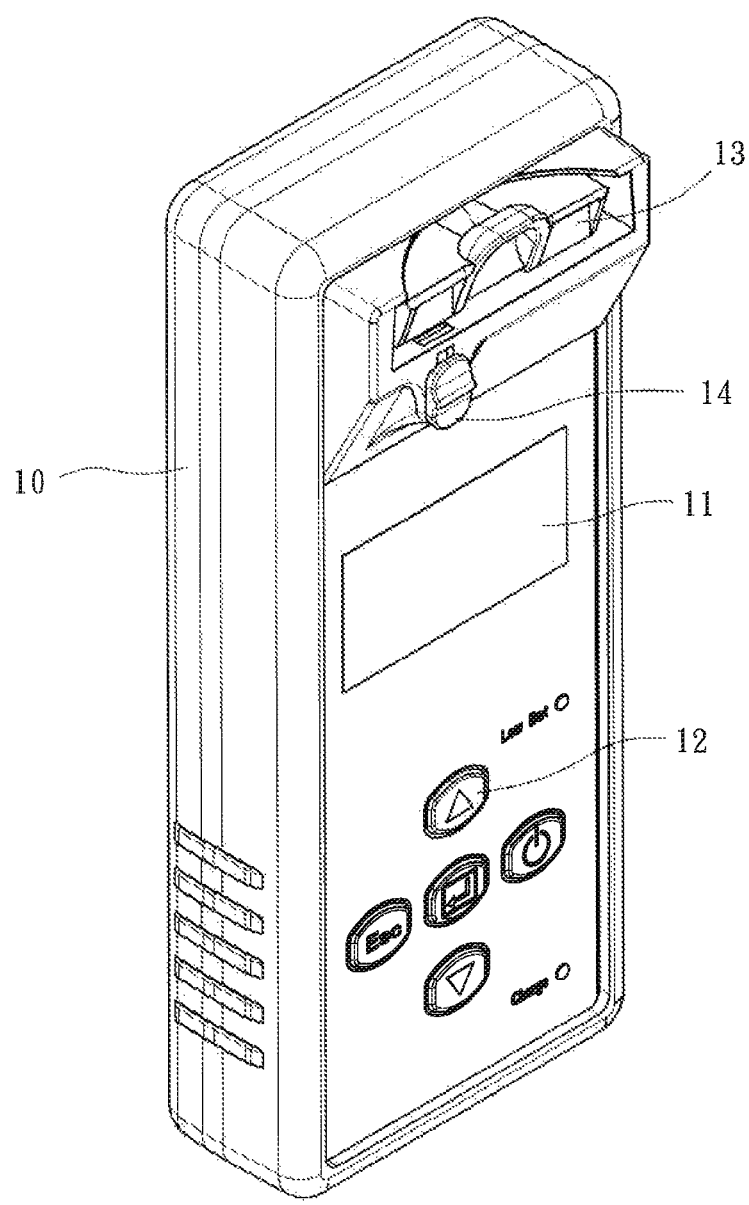
FIG. 1 is an oblique top elevational view of a tire pressure monitoring system setting tool in accordance with the present invention.
Figure 2:
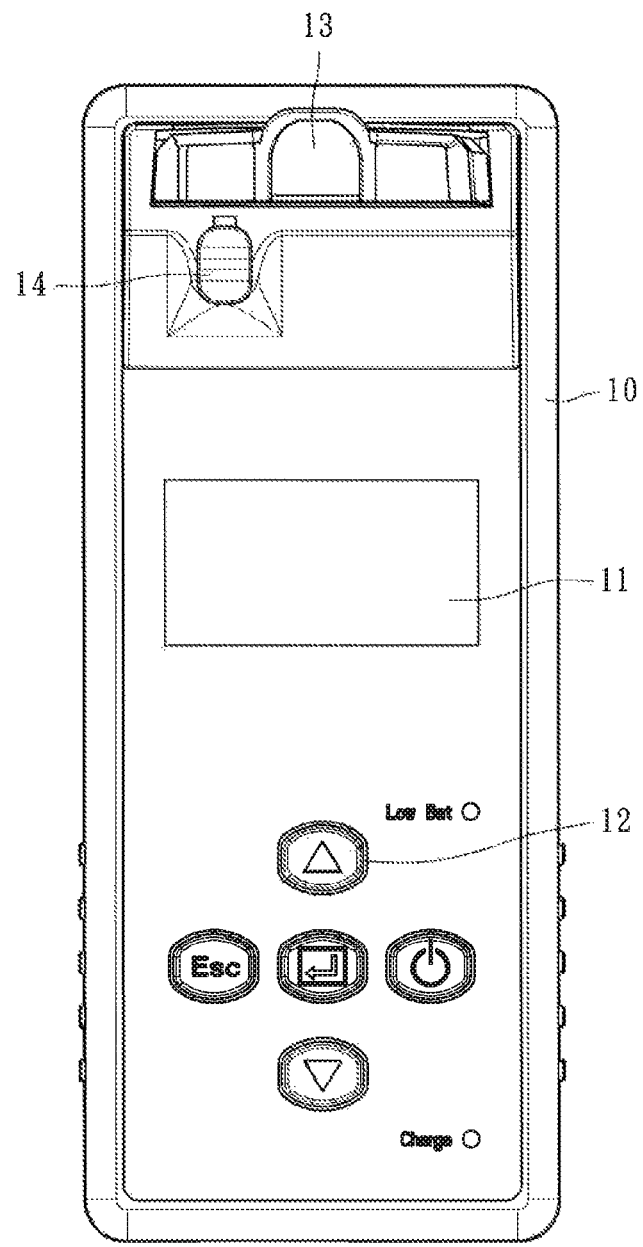
FIG. 2 is a front view of the tire pressure monitoring system setting tool in accordance with the present invention.
Figure 3:
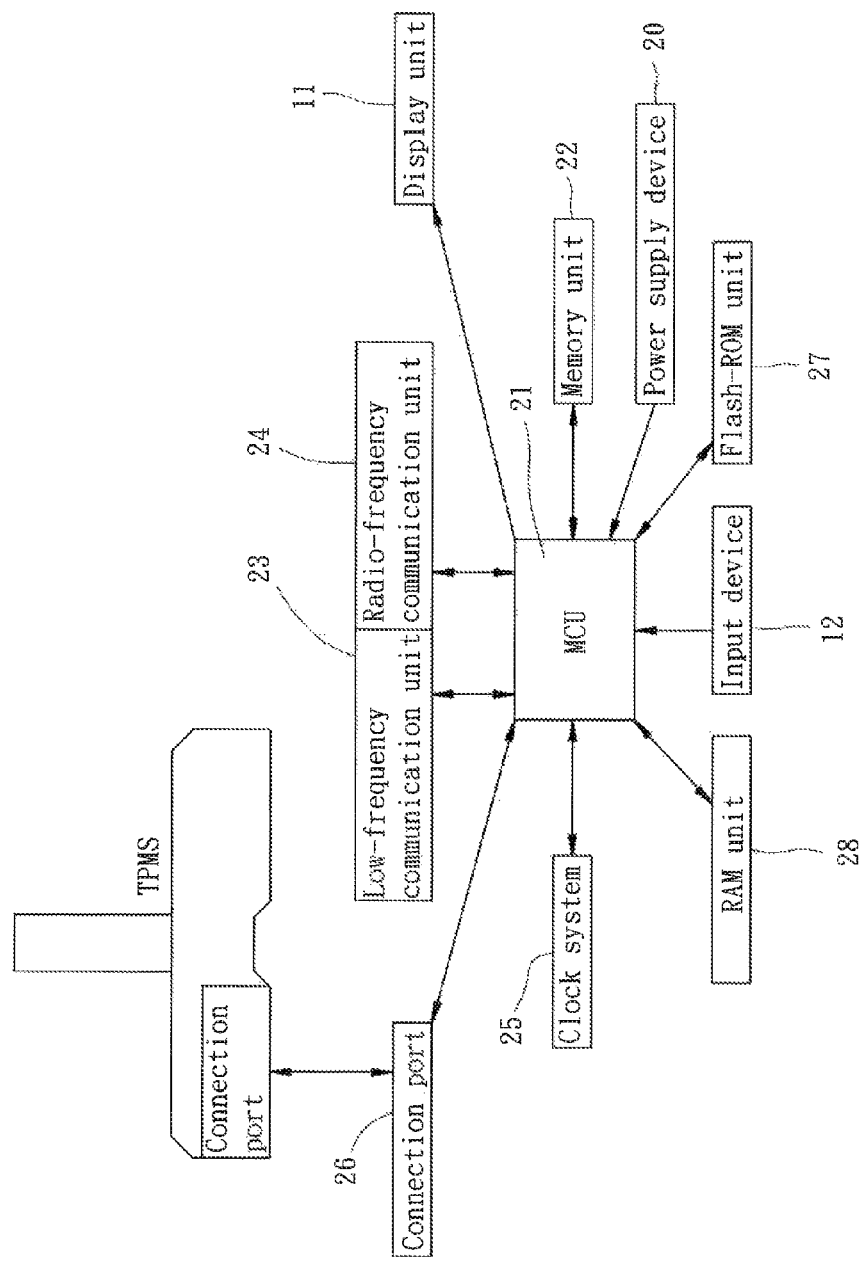
FIG. 3 is a block diagram of the internal circuit of the tire pressure monitoring system setting tool in accordance with the present invention.

Referring to FIGS. 1-3, a TPMS (tire pressure monitoring system) setting tool in accordance with the present invention is shown. The TPMS (tire pressure monitoring system) setting tool comprises a housing 10.

The housing 10 has a display unit 11 and an input device 12 mounted on the outside. The display unit 11 is a liquid crystal display. The input device 12 comprises a set of buttons. The housing 10 further comprises a receptacle 13 for receiving a TPMS, and a lock knob 14 disposed at one side relative to the receptacle 13. When a TPMS is put in the receptacle 13, the lock knob 14 locks the TPMS in place. Pressing the lock knob 14 can unlock the TPMS, allowing the TPMS to be moved out of the receptacle 13.

The housing 10 further has a circuit board and a power supply device mounted on the inside. The power supply device 20 is electrically connected to the circuit board, and adapted to provide the setting tool with the necessary working power supply.

The circuit board comprises:

a MCU (micro control unit) 21 electrically coupled with the display unit 11 and the input device 12;

a memory unit 22 electrically coupled to the MCU 21 and adapted for storing at least one TPMS communication protocol;

a low-frequency communication unit 23 electrically coupled to the MCU 21 and working an interface of the setting tool for external communication;

a radio-frequency communication unit 24 electrically coupled to the MCU 21 and working an interface of the setting tool for external communication;

a clock system 25 electrically coupled to the MCU 21;

a connection port 26 mounted in the receptacle 13 and electrically coupled to the MCU 21 and comprising a plurality of pins;

a flash-ROM unit 27 electrically coupled to the MCU 21; and a RAM unit 28 electrically coupled to the MCU 21.

With respect to the update operation of the storage communication protocol or ID code in the setting tool, the setting tool can be linked to an external computer or other data source by means of the low-frequency communication unit or radio-frequency communication unit, enabling the external computer or data source to fetch or update the stored communication protocol or ID code data in the setting tool.

The setting tool of the present invention is applicable to a TPMS having a mating connection port. During operation, insert the TPMS into the receptacle 13 of the housing 10 to connect its mating connection port to the connection port 26 of the setting tool. Because TPMSs for different models of cars from different manufacturers use different communication protocols, it is necessary to operate the input device and the display unit of the setting tool for selecting the desired communication protocol and ID code prior to programming. This operation procedure is same as the operation of conventional designs. Therefore, no further detailed description in this regard will be given.

After selection of the desired communication protocol and ID code, the selected communication protocol and ID code are written into the TPMS directly through a wired connection, finishing the programming.

Subject to the aforesaid structural design of the present invention, the memory unit of the setting tool has sufficient space for storing a plurality of communication protocols and ID codes, eliminating the insufficient storage space problem of the prior art designs. Further, the housing provides a connection port for the connection of the connection port of a TPMS directly for communication protocol or ID code programming, avoiding altering or erroneously setting the settings of other surrounding TPMSs. Further, the MCU has a clock system electrically connected thereto and the setting tool adopts wired connection, and therefore, the setting tool can examine the configuration of the connected TPMS directly, enabling the operator to make sure that the configuration of the connected TPMS is accurate. Because of wired connection for ID code reading and writing, the setting tool can read the programmed ID code from the TPMS and then display it on the display unit immediately after writing, enabling the operator to know quickly and clearly the result, to immediately examine the TPMS and to make sure the operation is successful, or to check the matching of the ID code of the TPMS. Therefore, the invention clearly improves the drawbacks of conventional designs, achieving the expected objects.

Of course, the setting tool of the present invention can also be used to copy a communication protocol or ID code. In this case, insert the old TPMS into the receptacle of the housing to electrically connect the connection port of the old TPMS to the connection port in the receptacle, and then operate the setting tool to read the communication protocol or ID code from the old TPMS and to further store the communication protocol or ID code in the memory unit of the setting tool. Thereafter, remove the old TPMS from the setting tool and then insert a new TPMS into the receptacle to electrically connect the connection port of the new TPMS to the connection port in the receptacle, enabling the setting tool to write the communication protocol or ID code of the old TPMS into the new TPMS.

What is claimed is:

1. A TPMS (tire pressure monitoring system) setting tool, comprising:
    a housing having mounted thereon a display unit and an input device and mounted therein a circuit board and a power supply device, said power supply device being electrically coupled to said circuit board for providing the TPMS setting tool with the necessary working power supply, said circuit board comprising:
    a MCU (micro control unit) electrically coupled with said display unit and said input device;
    a memory unit electrically connected to said MCU and adapted for storing communication protocols;
    a low-frequency communication unit electrically connected to said MCU;
    a radio-frequency communication unit electrically connected to said MCU;
    a clock system electrically connected to said MCU; and
    a connection port electrically connected to said MCU, said connection port comprising a plurality of pins;
    wherein said housing further comprises a receptacle located at one side thereof and adapted for receiving a TPMS; said connection port being installed in said receptacle;
    wherein said housing further comprises a lock knob disposed at one side relative to said receptacle and adapted to lock an inserted TPMS in said receptacle, allowing the inserted TPMS to be removed from said receptacle when said lock knob is pressed down by a person.

2. The TPMS setting tool as claimed in claim 1, wherein said circuit board comprises a flash-ROM (flash read only memory) unit.

3. The TPMS setting tool as claimed in claim 1, wherein said circuit board comprises a RAM (random access memory) unit.

* * * * *